US009124435B2

(12) United States Patent
Jung

(10) Patent No.: US 9,124,435 B2
(45) Date of Patent: Sep. 1, 2015

(54) SCHEME FOR SETTING UP SESSION IN A MOBILE COMMUNICATION SYSTEM

(71) Applicant: Samsung Electronics Co., Ltd, Gyeonggi-do (KR)

(72) Inventor: Joon-Ku Jung, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 120 days.

(21) Appl. No.: 14/063,965

(22) Filed: Oct. 25, 2013

(65) Prior Publication Data

US 2014/0119241 A1    May 1, 2014

(30) Foreign Application Priority Data

Oct. 25, 2012   (KR) ......................... 10-2012-0118972

(51) Int. Cl.
H04B 7/14 (2006.01)
H04L 12/14 (2006.01)
(52) U.S. Cl.
CPC .................................. *H04L 12/1407* (2013.01)
(58) Field of Classification Search
None
See application file for complete search history.

(56) References Cited

U.S. PATENT DOCUMENTS

| 2009/0313385 | A1 | 12/2009 | MacDonald et al. | |
| 2010/0150003 | A1* | 6/2010 | Andreasen et al. | 370/252 |
| 2012/0002548 | A1* | 1/2012 | Walstrom | 370/235 |
| 2012/0030331 | A1* | 2/2012 | Karampatsis | 709/223 |

* cited by examiner

*Primary Examiner* — Duc C Ho

(57) ABSTRACT

An apparatus and method for setting up a session between devices in a mobile communication system. The method is for setting up a session in a Policy and Charging Rules Function (PCRF) of a mobile communication system that includes a first terminal and a second terminal. The method includes receiving a first message including Internet Protocol (IP)/Port information of the first terminal from a Policy and Charging Enforcement Function (PCEF), receiving a second message including IP/Port information of the first terminal and IP/Port information of the second terminal from a Proxy Call Session Control Function (PCSCF), and setting up a session to the PCEF and a session to the PCSCF, based on the IP/Port information of the first terminal included in the first message and the IP/Port information of the first terminal included in the second message. The first terminal is a mobile terminal and the second terminal is a relay terminal that transmits and receives packet data between the PCEF and the PCSCF.

20 Claims, 3 Drawing Sheets

SCHEME FOR SETTING UP SESSION IN A MOBILE COMMUNICATION SYSTEM

CROSS-REFERENCE TO RELATED APPLICATION(S) AND CLAIM OF PRIORITY

The present application is related to and claims priority under 35 U.S.C. §119(a) to Korean Patent Application Serial No. 10-2012-0118972, which was filed in the Korean Intellectual Property Office on Oct. 25, 2012, the entire disclosure of which is hereby incorporated by reference.

TECHNICAL FIELD

The present disclosure relates to a mobile communication system, and more particularly, to a scheme for setting up a session between devices in a mobile communication system.

BACKGROUND

With the rapid development of communication technologies, mobile communication systems provide a packet service for enabling a multimedia service such as e-mail, still images, videos, and so forth, as well as a conventional voice service, to terminals.

So-called 3rd Generation (3G) mobile communication systems, which support both conventional voice service and the packet service, include a Code Division Multiple Access (CDMA) 2000 system using a synchronous scheme and a Universal Mobile Telecommunications System (UMTS) using an asynchronous scheme. The 3G mobile communication systems provide the multimedia service to the terminal through interworking with a particular network. In particular, the 3G mobile communication systems provide the multimedia service to the terminal by interworking with a communication network, an Internet Protocol (IP) Multimedia Subsystem (IMS) network that performs IP-based communication.

The mobile communication systems that interwork with the IMS network establish a Quality of Service (QoS) policy and charging rules for service usage and provide a service to terminals according to the established policy and charging rules. To this end, a Policy and Charging Rules Function (PCRF) is provided with service information from an Application Function (AF) to create Policy and Charging Control (PCC) rules. The PCRF provides the created PCC rules to a Policy and Charging Enforcement Function (PCEF). Then, the PCEF provides a QoS corresponding to a service flow to the terminal based on the PCC rules.

To transmit and receive the PCC rules, the PCRF determines whether an IP provided from the PCEF is identical to an IP provided from the AF and, if both IPs are identical to each other, the PCRF forms a session between the PCRF and the PCEF and a session between the PCRF and the AF. This process is referred to as a PCRF session binding setting process.

If the PCRF session binding setting process is not normally completed in the PCRF, the PCC rules cannot be created. Hence, a need exists for a scheme capable of efficiently performing the PCRF session binding setting process regardless of which device is included in the mobile communication system.

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies, it is a primary object to provide a method and apparatus for setting up a session in a mobile communication system that interworks with an IMS network.

Moreover, various aspects of the present disclosure provide a method and apparatus for setting up a session when a terminal for performing an additional function is provided in a mobile communication system that interworks with an Internet Protocol Multimedia Subsystem (IMS) network.

Other objects to be provided in the present disclosure may be understood by embodiments described below.

According to one of various embodiments of the present disclosure, there is provided a method for setting up a session in a Policy and Charging Rules Function (PCRF) of a mobile communication system that includes a first terminal and a second terminal. The method includes receiving a first message including Internet Protocol (IP)/Port information of the first terminal from a Policy and Charging Enforcement Function (PCEF), receiving a second message including IP/Port information of the first terminal and IP/Port information of the second terminal from a Proxy Call Session Control Function (PCSCF), and setting up a session to the PCEF and a session to the PCSCF, based on the IP/Port information of the first terminal included in the first message and the IP/Port information of the first terminal included in the second message. The first terminal is a mobile terminal and the second terminal is a relay terminal that transmits and receives packet data between the PCEF and the PCSCF.

Moreover, according to one of various embodiments of the present disclosure, there is also provided an apparatus for setting up a session in a Policy and Charging Rules Function (PCRF) of a mobile communication system that comprises a first terminal and a second terminal. The apparatus includes a receiver configured to receive a first message including Internet Protocol (IP)/Port information of the first terminal from a Policy and Charging Enforcement Function (PCEF) and a second message including IP/Port information of the first terminal and IP/Port information of the second terminal from a Proxy Call Session Control Function (PCSCF). The apparatus also includes a controller configured to set up a session to the PCEF and a session to the PCSCF, based on the IP/Port information of the first terminal included in the first message and the IP/Port information of the first terminal included in the second message. The first terminal is a mobile terminal and the second terminal is a relay terminal that transmits and receives packet data between the PCEF and the PCSCF.

Furthermore, according to one of various embodiments of the present disclosure, there is also provided a method for setting up a session in a mobile communication system that includes a first terminal and a second terminal. The method includes sending, by a Policy and Charging Enforcement Function (PCEF), a first session setup request message including Internet Protocol (IP)/Port information of the first terminal received from the first terminal to a Policy and Charging Rules Function (PCRF) and the second terminal; checking, by the second terminal, the IF/Port information of the first terminal included in the first session setup request message and sending a second session setup request message which includes a header including the IP/Port information of the first terminal and includes IP/Port information of the second terminal to a Proxy Call Session Control Function (PCSCF); determining, by the PCSCF, whether the header exists in the second session setup request message and delivering the IP/Port information of the first terminal included in the header and the IP/Port information of the second terminal to the PCRF; and setting up, by the PCRF, a session to the PCEF and a session to the PCSCF by using the IP/Port information of the first terminal received from the PCEF and the IP/Port information of the first terminal received from the PCSCF.

In addition, according to one of various embodiments of the present disclosure, there is also provided a mobile communication system for setting up a session between network entities. The mobile communication system includes a Policy and Charging Enforcement Function (PCEF) configured to send a first session setup request message including Internet Protocol (IP)/Port information of a first terminal received from the first terminal to a Policy and Charging Rules Function (PCRF) and a second terminal. The second terminal is configured to check the IP/Port information of the first terminal included in the first session setup request message and send a second session setup request message which includes a header including the IP/Port information of the first terminal and IP/Port information of the second terminal to a Proxy Call Session Control Function (PCSCF). The PCSCF is configured to determine whether the header exists in the second session setup request message and deliver the IP/Port information of the first terminal included in the header and the IP/Port information of the second terminal to the PCRF. The PCRF is configured to set up a session to the PCEF and a session to the PCSCF by using the IP/Port information of the first terminal received from the PCEF and the IP/Port information of the first terminal received from the PCSCF.

According to one of various embodiments of the present disclosure, there is also provided a method for supporting session setup of a second terminal in a mobile communication system including a first terminal and the second terminal that relays packet data between a Policy and Charging Enforcement Function (PCEF) and a Proxy Call Session Control Function (PCSCF). The method includes receiving a first session setup request message including Internet Protocol (IP)/Port information of the first terminal from the PCEF, checking the IP/Port information of the first terminal included in the first session setup request message, and sending a second session setup request message which includes a header including the IP/Port information of the first terminal and includes IP/Port information of the second terminal to the PCSCF.

According to one of various embodiments of the present disclosure, there is also provided a second terminal for supporting session setup in a mobile communication system including a first terminal and the second terminal which relays packet data of the first terminal between a Policy and Charging Enforcement Function (PCEF) and a Proxy Call Session Control Function (PCSCF). The second terminal is configured to receive a first session setup request message including Internet Protocol (IP)/Port information of the first terminal from the PCEF, check the IP/Port information of the first terminal included in the first session setup request message, and send a second session setup request message which includes a header including the IP/Port information of the first terminal and includes IP/Port information of the second terminal to the PCSCF.

Other aspects, advantages, and salient features of the disclosure will become apparent to those skilled in the art from the following detailed description, which, taken in conjunction with the annexed drawings, discloses an exemplary embodiment of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or, the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components, and structures.

DETAILED DESCRIPTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system. Hereinafter, various embodiments of the present disclosure will be described in detail with reference to the accompanying drawings. In the following description, only parts necessary for understanding operations of the present disclosure will be described, and a detailed description of known functions and configurations incorporated herein will be omitted so as not to make the subject matter of the present disclosure unclear.

The terms and words used in the following description and claims are not limited to the bibliographical meanings, but, are merely used by the inventor to enable a clear and consistent understanding of the disclosure. Accordingly, it should be apparent to those skilled in the art that the following description of exemplary embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces First, a description will be made of a method for setting up Policy and Charging Rules Function (PCRF) session binding in a mobile communication system.

Figure 1:
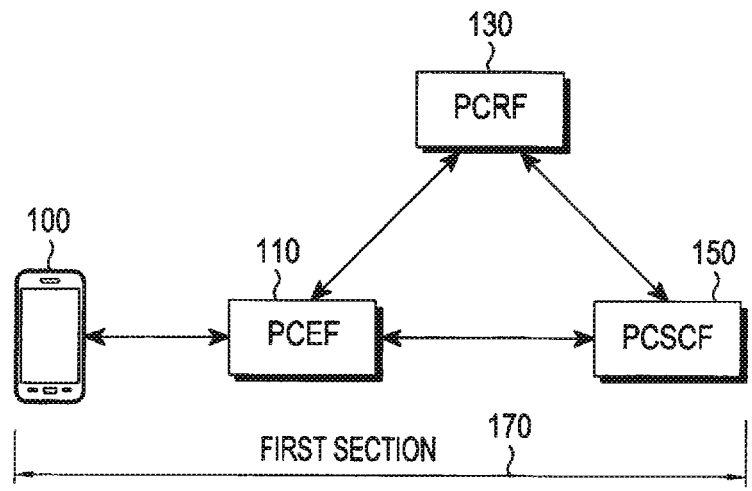
FIG. 1 is a schematic diagram showing a mobile communication system that interworks with an Internet Protocol (IP) Multimedia Subsystem (IMS) network.

FIG. 1 is a schematic diagram showing a mobile communication system that interworks with an Internet Protocol (IP) Multimedia Subsystem (IMS) network.

Referring to FIG. 1, a mobile communication system may include a terminal 100, a Policy and Charging Enforcement Function (PCEF) 110, a PCRF 130, and a Proxy Call Session Control Function (PCSCF) 150.

The terminal 100 performs a session setup process with and transmits and receives packet data to and from the mobile communication system, and operates in at least one of a Packet Switched (PS) domain and a Circuit Switched (CS) domain. The terminal 100 transmits and receives packet data to and from the mobile communication system, by using a Wireless Application Protocol (WAP) that is a wireless Internet access protocol, Microsoft Internet Explorer (MIE) based on a HyperText Markup Language (HTML) using a HyperText Transfer Protocol (HTTP), a handheld device transport protocol, a File Transfer Protocol (FTP), and an Extensible Markup Language (XML) Configuration Access Protocol (XCAP).

The PCEF 110 is included in a Gateway General Packet Radio Service (GPRS) Support Node (GGSN), and manages a flow based on a policy enforcement and charging function. By managing the flow, the PCEF 110 may control user-plane traffic handling and manage a Quality of Service (QoS). That is, for a media flow under policy control, the PCEF 110 may permit passage of the media flow when a corresponding gateway is opened. For a media flow under charging control, the PCEF 110 permits passage of the media flow through a gateway when corresponding PCC rules exist.

The PCRF 130 manages a flow based on a policy control determination and charging control function. That is, the PCRF 130 performs media flow sensing, gateway control, QoS control, and network control for a flow based on charging for the PCEF 110. The PCRF 130 receives session information and media information from the PCSCF 150, and notifies the PCSCF 150 of a traffic plane event. To this end, the PCRF 130 determines PCC rules and sets the PCC rules in the PCEF 110 included in the GGSN. Information used for PCC rule determination is provided from the PCSCF 150 and the PCEF 110. Information provided from the PCSCF 150 includes session information, media information, and subscriber information, and information provided from the PCEF 110 includes IP-Connectivity Access Network (CAN) bearer attribute information, request form information, and subscriber information.

The PCSCF 150 is a system that provides an IP-based service, corresponds to an AF, and delivers media flow information between an originating terminal and an incoming terminal to the PCRF 130. The media flow information between the originating terminal and the incoming terminal corresponds to information in a first section 170 in FIG. 1, and is flow information actually recognized in the PCEF 110. The PCSCF 150 is a point the terminal 100 meets when accessing an IMS domain through an access network. The PCSCF 150 sets up a call session and receives and processes a Session Initiation Protocol (SIP) message sent from the terminal 100. If it is determined that the PCRF 130 is in an abnormal state, the PCSCF 150 sends a session progress message and a session setup response message, which are set to be sent after PCC rule application of the PCRF 130, to the terminal 100.

Herein, a PCRF session binding setting process is performed as described below.

The PCRF 130 receives IP information of the terminal 100 from the PCEF 110. The terminal 100 delivers the IP information of the terminal 100 to the PCSCF 150 through the SIP message, and the PCSCF 150 delivers the IP information of the terminal 100, which is included in the SIP message, to the PCRF 130.

The PCRF 130 compares the IP information received from the PCEF 110 with the IP information delivered from the PCSCF 150. If both IP information are identical to each other, the PCRF 130 processes session binding between the PCRF 130 and the PCEF 110 and session binding between the PCRF 130 and the PCSCF 150 as successful. Alternatively, if they are different from each other, the PCRF 130 processes session binding as failed.

If a new device is added between the PCEF 110 and the PCSCF 150 of FIG. 1 (for example, as in FIG. 2), the IP information received from the PCEF 110 and the IP information delivered from the PCSCF 150 may be different from each other in session binding setting of the PCRF 130, such that the PCRF 130 may not successfully set session binding.

Figure 2:
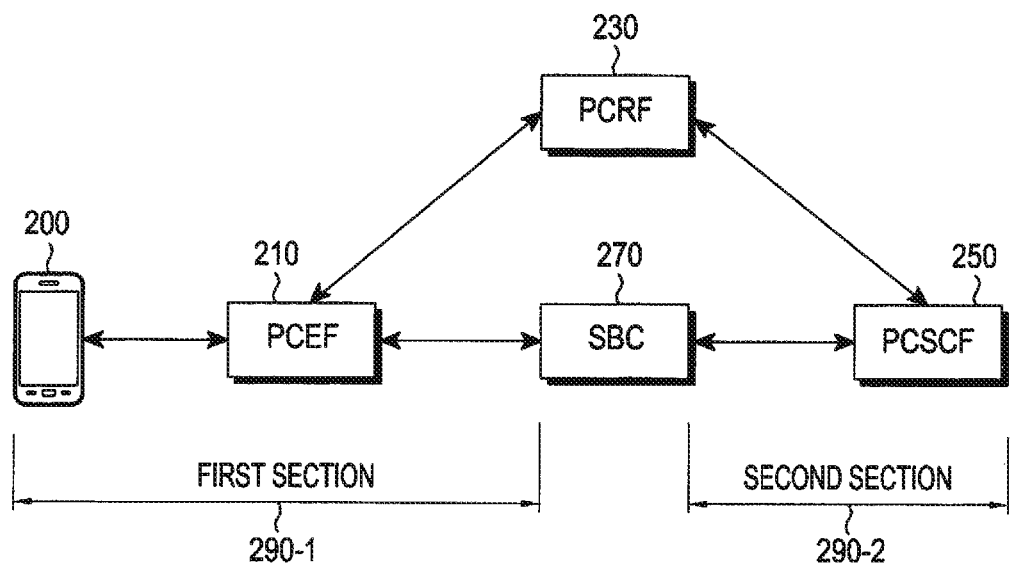
FIG. 2 is a schematic diagram showing a mobile communication system that interworks with an IMS network according to the present disclosure.

FIG. 2 is a schematic diagram showing a mobile communication system that interworks with an IMS network according to the present disclosure.

Referring to FIG. 2, the mobile communication system may include a terminal 200, a PCEF 210, a PCRF 230, a PCSCF 250, and a Session Border Controller (SBC) 270. Herein, the terminal 200, the PCEF 210, the PCRF 230, and the PCSCF 250 perform the same operations as those of the terminals 100, the PCEF 110, the PCRP 130, and the PCSCF 150 described with reference to FIG. 1, and thus a detailed description thereof will not be provided.

The SBC 270 relays multimedia communication, such as high-quality voice and images, between an access network and a core network based on security, stably protects the core network from various attacks, and performs various functions, such as session permission, connection, and load control, in a Voice over Internet Protocol (VoIP) network that connects to a private network.

Upon receiving the SIP message from the terminal 200, the SBC 270 changes IP/Port information included in the received SIP message, such that when information is delivered from the terminal 200 to the PCSCF 250 through the SBC 270, IP/Port information of all packet flows delivered through the SBC 270 may be changed. The SBC 270 may include a table regarding the delivered IP/Port information of the terminal 200 and the changed IP/Port information.

That is, the SBC 270 is recognized as a new terminal, and the IP/Port information delivered from the terminal 200 to the SBC 270 is different from IP/Port information output from the SBC 270. In FIG. 2, an information transmission/reception section between the terminal 200 and the SBC 270 is indicated as a first section 290-1, and an information transmission/reception section between the SBC 270 and the PCSCF 250 is indicated as a second section 290-2.

The PCSCF 250 delivers IP/Port information regarding the second section 290-2 to the PCRF 230 which then creates PCC rules by using the IP/Port information regarding the second section 290-2 and delivers the IP/Port information to the PCEF 210. However, flow information actually delivered to the PCEF 210 includes IP/Port information regarding the first section 290-1, and as a result, a corresponding media flow is not applied to a Service-based Data Flow (SDF) flow established using the PCC rules delivered from the PCRF 230. That is, the PCEF 210 may apply a corresponding media flow to the SDF filter if the PCSCF 250 delivers the IP/Port information regarding the first section 290-1 to the PCRF 230.

In regard to PCRF session binding, the PCEF 210 delivers IP information of the terminal 200 to the PCRF 230 and the PCSCF 250 delivers IP information of the terminal 200 changed by the SBC 270 to the PCRF 230. Thus, the PCRF 230 compares the delivered IP information of the terminal 200 with the IP information of the terminal 200 changed by the SBC 270, and processes session binding as failed because both IP information are different from each other. Due to failed session binding setting, the PCRF 230 may not be provided with a service provided by the PCSCF 250, and consequently, the PCRF 230 may not provide the PCC rules to the PCEF 210 and thus may not provide policy information to the PCEF 210. As a result, a QoS service specified for each service flow may not be provided.

Therefore, a need exists for a scheme for solving problems of a PCRF session binding setting failure and delivery of wrong media flow information to the PCEF due to the IP/Port information changed by the SBC, to provide a QoS service specific for each service flow through PCRF interworking in a mobile communication environment in which the terminal (for example, the SBC) for performing an additional function is provided in the mobile communication system that interworks with a general IMS network.

To this end, a description will be made of a method and apparatus for sending and receiving a SIP message including IP/Port information between devices included in a mobile communication system according to an embodiment of the present disclosure.

Figure 3:
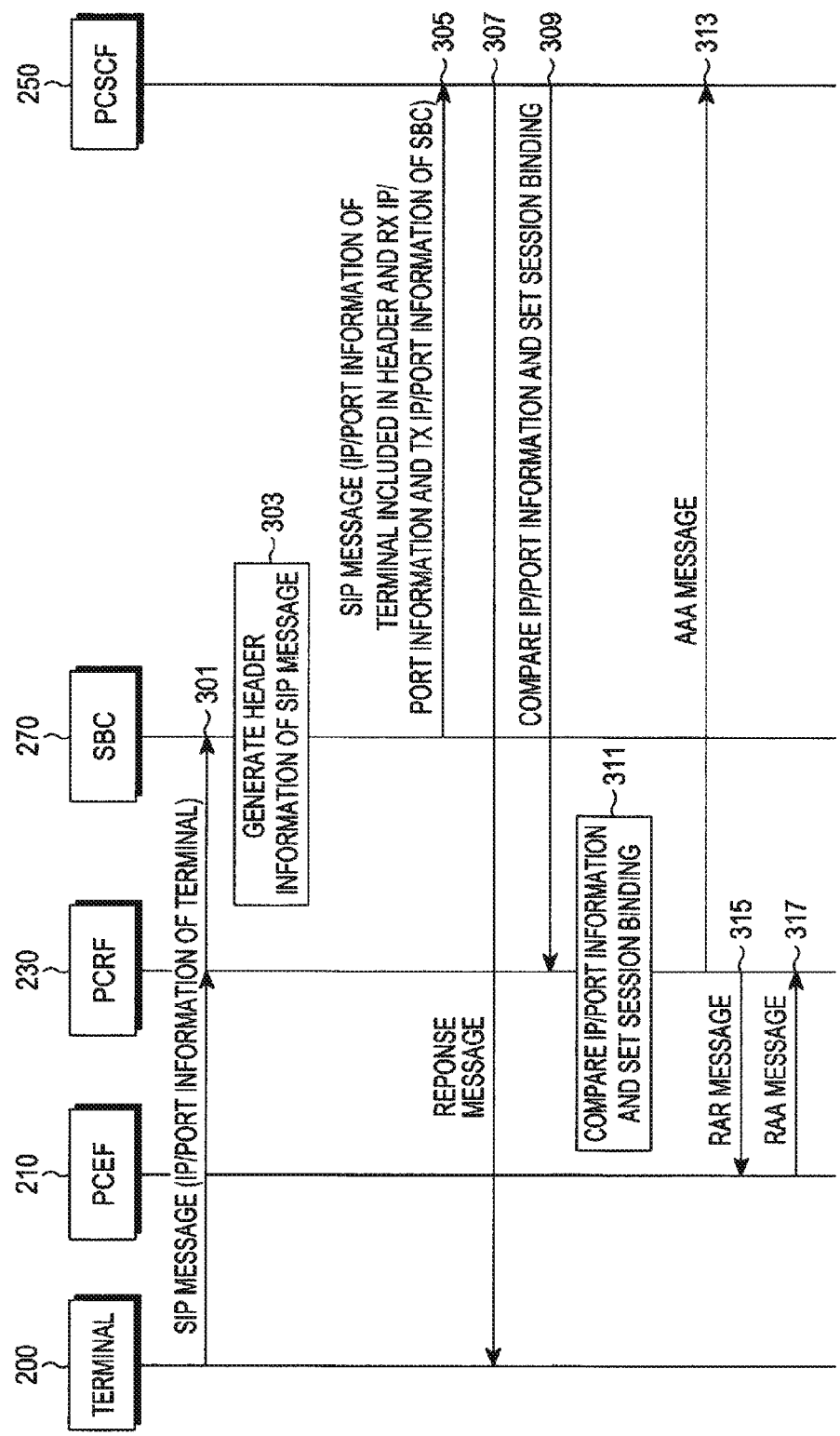
FIG. 3 is a ladder diagram showing a method for setting up a session in a mobile communication system according to an embodiment of the present disclosure.

FIG. 3 is a ladder diagram showing a method for setting up a session in a mobile communication system according to an embodiment of the present disclosure.

Referring to FIG. 3, in operation 301, the terminal 200 sends a SIP message including IP/Port information of the terminal 200 to the PCRF 230 and the SBC 270 through the PCEF 210.

In operation 303, the SBC 270 checks the IP/Port information of the terminal 200 included in the SIP message delivered from the PCEF 210, and incorporates the checked IP/Port information of the terminal 200 into a header of the SIP message.

In operation 305, the SBC 270 sends the SIP message including the header, which includes the IP/Port information of the terminal 200, and including Reception (Rx) IP/Port information and Transmission (Tx) IP/Port information of the SBC 270, to the PCSCF 250.

In operation 307, the PCSCF 250 sends a response (100 TRYING) message indicating normal reception of the SIP message to the terminal 200.

The SIP message generated in the SBC 270 may include an SIP header configured as shown in Table 1.

TABLE 1

P-Media-Flow-Info = "P-Media-Flow-Info" HCOLON Media-Flow-Info-Param
\*(COMMA Media-Flow-Info-Param)
Media-Flow-Info-Param = type SEMI
  "src" EQUAL LDQUOT ip_address HCOLON port RDQUOT SEMI
  "dst" EQUAL LDQUOT ip_address HCOLON port RDQUOT
type = "sig" / "video" / "audio" / "message" / "data" / "application" /
  "text" / "control" / "other"
ip_address = IPv4address / IPv6reference
IPv4address = 1\*3DIGIT "." 1\*3DIGIT "." 1\*3DIGIT "." 1\*3DIGIT
IPv6reference = "[" IPv6address "]"
IPv6address = hexpart [ ":" IPv4address ]
port = 1\*DIGIT
Example)
P-Media-Flow-Info:
sig;src="1.1.1.1:5060";msrc="172.16.15.24:40000";dst="2.2.2.2:5080",
video;src="1.1.1.1:10001";msrc="172.16.15.24:40000";dst="2.2.2.2:20001",
audio;src="1.1.1.1:10002";msrc="172.16.15.24:42000";dst="2.2.2.2:20002"

In Table 1, "sig", "audio", and "video" correspond to media type information of a flow. "src" indicates IP/Port information of the terminal 200, and "dst" indicates Rx IP/Port information of the SBC 270. "msrc(;modified src)" indicates IP/Port information of src information change by the SBC 270. "msrc" may be used when the PCSCF 250 determines an association relationship between plural flow information.

Referring back to FIG. 3, in operation 309, the PCSCF 250 checks the SIP message delivered from the SBC 270 to determine whether a header exists, and thus if the header exists, the PCSCF 250 applies information included in the header to a flow filter portion of service information and delivers a message to the PCRF 230. That is, in operation 309, the PCSCF 250 incorporates the IP/Port information of the terminal 200, which is included in the header, and the Rx IP/Port information of the SBC 270 into an Authentication Authorization Request (AAR) message and sends the AAR message to the PCRF 230.

In operation 311, the PCRF 230 compares the IP/Port information of the terminal 200 included in the SIP message delivered from the PCEF 210 with the IP/Port information of the terminal 200 included in the AAR message delivered from the PCSCF 250, such that if both IP/Port information are identical to each other, the PCRF 230 sets up a session between the PCRF 230 and the PCEF 210 and a session between the PCRF 230 and the PCSCF 250; alternatively, if they are different from each other, the PCRF 230 processes session setup between PCRF 230 and the PCEF 210 and between the PCRF 230 and the PCSCF 250 as failed. In some embodiments, since the SBC 270 delivers the IP/Port information of the terminal 200 to the PCSCF 250 through the header, it is apparent that in the PCRF 230, the IP/Port information of the terminal 200 delivered from the PCSCF 250 is identical to the IP/Port information of the terminal 200 delivered from the PCEF 210. Thus, in operation 311, the PCRF 230 may set up a session between the PCRF 230 and the PCEF 210 and a session between the PCRF 230 and the PCSCF 250.

In operation 313, the PCRF 230 delivers information about whether session setup succeeds to the PCSCF 250 through an Authentication Authorization Answer (AAA) message.

In operation 315, the PCRF 230 delivers the information about whether session setup succeeds and the PCC rules to the PCEF 210 through a Re-Authentication Authorization Request (RAR) message. In operation 317, the PCEF 210 sends a Re-Authentication Authorization Answer (RAA) message indicating reception of the RAR message from the PCRF 230 to the PCRF 230.

Hereinafter, referring to FIGS. 4 and 5, a description will be made of operations and an apparatus of the PCRF 230 for performing a session binding process in a mobile communication system according to the present disclosure. In the following description, a first terminal may be a terminal for performing a session setup process with transmitting and receiving packet data to and from the mobile communication system, and a second terminal may be a terminal for relaying packet data between the PCEF 210 and the PCSCF 250. For example, the first terminal may be the terminal 200 of FIG. 2 and the second terminal may be the SBC 270 of FIG. 2.

Figure 4:
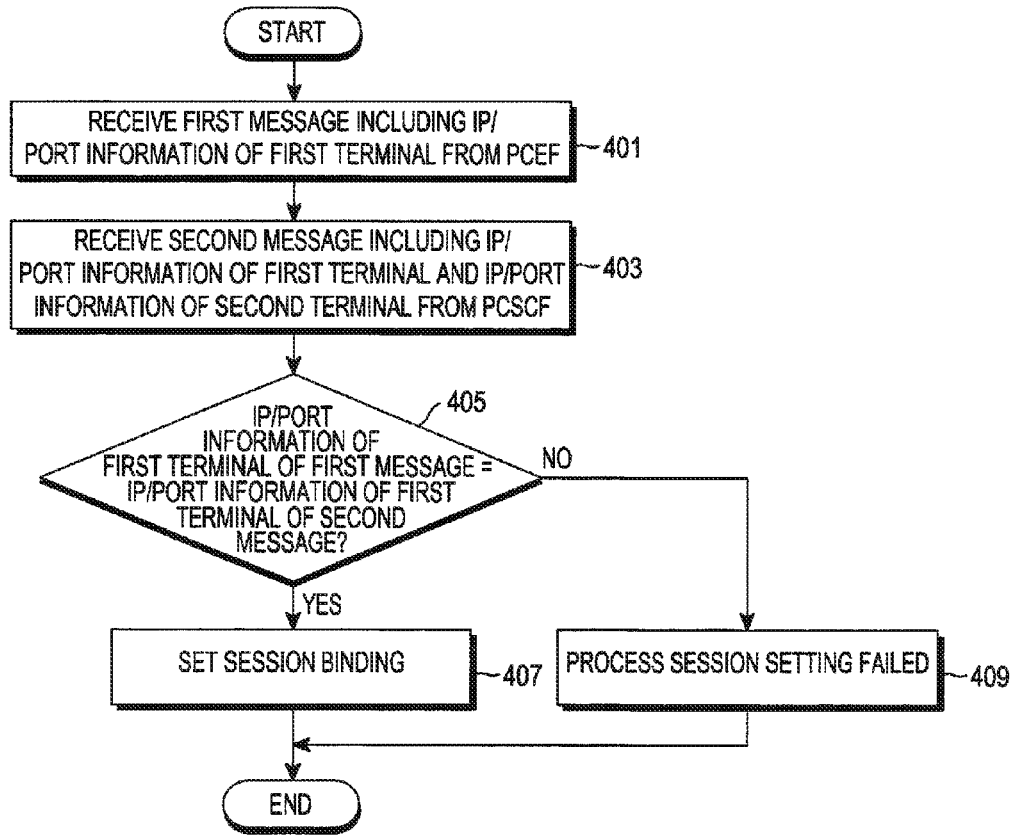
FIG. 4 is a flowchart showing a method for setting up a session in a Policy and Charging Rules Function (PCRF) included in a mobile communication system according to an embodiment of the present disclosure.

FIG. 4 is a flowchart showing a method for setting up a session in the PCRF 230 included in a mobile communication system according to an embodiment of the present disclosure.

Referring to FIG. 4, in operation 401, the PCRF 230 receives a first message including IP/Port information of a first terminal from the PCEF 210.

In operation 403, the PCRF 230 receives a second message including the IP/Port information of the first terminal and IP/Port information of a second terminal from the PCSCF 250. To this end, the PCSCF 250 receives a message which includes a header including the IP/Port information of the first terminal and includes the IP/Port information of the second terminal from the SBC 290 and delivers the IP/Port information of the first terminal and the IP/Port information of the second terminal to the PCRF 230.

In operation 405, the PCRF 230 determines whether the IP/Port information of the first terminal included in the first message and the IP/Port information of the first terminal included in the header of the second message are identical to each other, if both IP/Port information are identical to each other, the PCRF 230 goes to operation 407; otherwise, if both IP/Port information are not identical to each other, the PCRF 230 goes to operation 409. The PCRF 230 may perform operation 407 without performing operation 405.

In operation 407, the PCRF 230 sets session binding between the PCRF 230 and the PCEF 210 and between the PCRF 230 and the PCSCF 250. Alternatively, in operation 409, the PCRF 230 processes session setup as failed.

Figure 5:
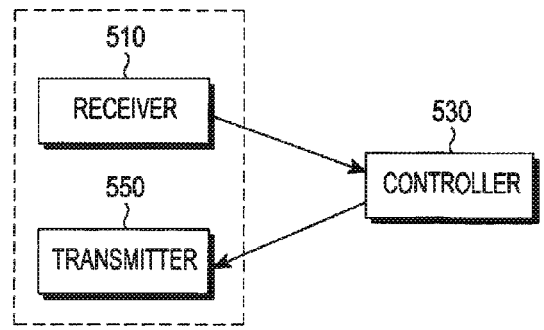
FIG. 5 is a block diagram showing an apparatus for setting up a session in a PCRF included in a mobile communication system according to an embodiment of the present disclosure.

FIG. 5 is a block diagram showing an apparatus for setting up a session in the PCRF 230 included in a mobile communication system according to an embodiment of the present disclosure.

Referring to FIG. 5, the PCRF 230 may include a receiver 510, a transmitter 550, and a controller 530. The receiver 510 and the transmitter 550 may also be configured as one unit.

The receiver 510 receives the first message including the IP/Port information of the first terminal from the PCEF 210 and the second message including the IP/Port information of the first terminal and the IP/Port information of the second terminal from the PCSCF 250.

The controller 530 determines whether the IP/Port information of the first terminal included in the first message received from the PCEF 210 is identical to the IP/Port information of the first terminal included in the second message received from the PCSCF 250. The controller 530 sets session binding between the PCRF 230 and the PCEF 210 and between the PCRF 230 and the PCSCF 250 upon a determination that both IP/Port information are identical to each other. Upon a determination that both IP/Port information are not identical to each other, the controller 530 processes session setup as failed.

The transmitter 550 delivers information indicating whether session setup succeeds to the PCEF 210 and the PCSCF 250.

As is apparent from the foregoing description, according to the present disclosure, in the mobile communication environment where the SBC is provided, a PCRF interworking call may be made. Moreover, the present disclosure may also efficiently provide IP/Port information prior to application of the SBC in the mobile communication system where the SBC is applied.

The other effects may be explicitly or implicitly disclosed in the description of the present disclosure.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for setting up a session in a Policy and Charging Rules Function (PCRF) of a mobile communication system that comprises a first terminal and a second terminal, the method comprising:
   receiving a first message including Internet Protocol (IP)/Port information of the first terminal from a Policy and Charging Enforcement Function (PCEF);
   receiving a second message including IP/Port information of the first terminal and IP/Port information of the second terminal from a Proxy Call Session Control Function (PCSCF); and
   setting up a session to the PCEF and a session to the PCSCF, based on the IP/Port information of the first terminal included in the first message and the IP/Port information of the first terminal included in the second message,
   wherein the first terminal is a mobile terminal and the second terminal is a relay terminal that transmits and receives packet data between the PCEF and the PCSCF.

2. The method of claim 1, wherein the second terminal is a Session Border Controller (SBC).

3. The method of claim 1, wherein the setting up of the session comprises:
   comparing the IP/Port information of the first terminal included in the first message with the IP/Port information of the first terminal included in the second message to determine whether both IP/Port information are identical to each other; and
   setting up a session to the PCEF and a session to the PCSCF if both IP/Port information are identical to each other, and processing session setup as failed if both IP/Port information are not identical to each other.

4. The method of claim 3, further comprising delivering information indicating whether session setup succeeds to the PCEF and the PCSCF.

5. An apparatus for setting up a session in a Policy and Charging Rules Function (PCRF) of a mobile communication system that comprises a first terminal and a second terminal, the apparatus comprising:
   a receiver configured to receive a first message including Internet Protocol (IP)/Port information of the first terminal from a Policy and Charging Enforcement Function (PCEF) and a second message including IP/Port information of the first terminal and IP/Port information of the second terminal from a Proxy Call Session Control Function (PCSCF); and
   a controller configured to set up a session to the PCEF and a session to the PCSCF, based on the IP/Port information of the first terminal included in the first message and the IP/Port information of the first terminal included in the second message,
   wherein the first terminal is a mobile terminal and the second terminal is a relay terminal that transmits and receives packet data between the PCEF and the PCSCF.

6. The apparatus of claim 5, wherein the second terminal is a Session Border Controller (SBC).

7. The apparatus of claim 5, wherein the controller compares the IP/Port information of the first terminal included in the first message with the IP/Port information of the first terminal included in the second message to determine whether both IP/Port information are identical to each other, and sets up a session to the PCEF and a session to the PCSCF if both IP/Port information are identical to each other, and processes session setup as failed if both IP/Port information are not identical to each other.

8. The apparatus of claim 7, further comprising a transmitter configured to deliver information indicating whether session setup succeeds to the PCEF and the PCSCF.

9. A method for setting up a session in a mobile communication system that comprises a first terminal and a second terminal, the method comprising:
sending, by a Policy and Charging Enforcement Function (PCEF), a first session setup request message including Internet Protocol (IP)/Port information of the first terminal received from the first terminal to a Policy and Charging Rules Function (PCRF) and the second terminal;
checking, by the second terminal, the IP/Port information of the first terminal included in the first session setup request message and sending a second session setup request message which includes a header including the IP/Port information of the first terminal and includes IP/Port information of the second terminal to a Proxy Call Session Control Function (PCSCF);
determining, by the PCSCF, whether the header exists in the second session setup request message and delivering the IP/Port information of the first terminal included in the header and the IP/Port information of the second terminal to the PCRF; and
setting up, by the PCRF, a session to the PCEF and a session to the PCSCF by using the IP/Port information of the first terminal received from the PCEF and the IP/Port information of the first terminal received from the PCSCF.

10. The method of claim 9, wherein the first terminal is a mobile terminal and the second terminal is a relay terminal that transmits and receives packet data between the PCEF and the PCSCF.

11. The method of claim 10, wherein the second terminal is a Session Border Controller (SBC).

12. The method of claim 10, wherein the setting up of the session by the PCRF comprises:
comparing the IP/Port information of the first terminal received from the PCEF with the IP/Port information of the first terminal received from the PCSCF to determine whether both IP/Port information are identical to each other; and
setting up a session to the PCEF and a session to the PCSCF if both IP/Port information are identical to each other, and processing session setup as failed if both IP/Port information are not identical to each other.

13. A mobile communication system for setting up a session between network entities, the mobile communication system comprising:
a Policy and Charging Enforcement Function (PCEF) configured to send a first session setup request message including Internet Protocol (IP)/Port information of a first terminal received from the first terminal to a Policy and Charging Rules Function (PCRF) and a second terminal;
the second terminal configured to check the IP/Port information of the first terminal included in the first session setup request message and send a second session setup request message which includes a header including the IP/Port information of the first terminal and IP/Port information of the second terminal to a Proxy Call Session Control Function (PCSCF);
the PCSCF configured to determine whether the header exists in the second session setup request message and deliver the IP/Port information of the first terminal included in the header and the IP/Port information of the second terminal to the PCRF; and
the PCRF configured to set up a session to the PCEF and a session to the PCSCF by using the IP/Port information of the first terminal received from the PCEF and the IP/Port information of the first terminal received from the PCSCF.

14. The mobile communication system of claim 13, wherein the first terminal is a mobile terminal and the second terminal is a relay terminal that transmits and receives packet data between the PCEF and the PCSCF.

15. The mobile communication system of claim 14, wherein the second terminal is a Session Border Controller (SBC).

16. The mobile communication system of claim 13, wherein the PCRF compares the IP/Port information of the first terminal included in the first message with the IP/Port information of the first terminal included in the second message to determine whether both IP/Port information are identical to each other and sets up a session to the PCEF and a session to the PCSCF if both IP/Port information are identical to each other, and processes session setup as failed if both IP/Port information are not identical to each other.

17. A method for supporting session setup of a second terminal in a mobile communication system comprising a first terminal and the second terminal that relays packet data between a Policy and Charging Enforcement Function (PCEF) and a Proxy Call Session Control Function (PCSCF), the method comprising:
receiving a first session setup request message including Internet Protocol (IP)/Port information of the first terminal from the PCEF;
checking the IP/Port information of the first terminal included in the first session setup request message; and
sending a second session setup request message which includes a header including the IP/Port information of the first terminal and includes IP/Port information of the second terminal to the PCSCF.

18. The method of claim 17, wherein the second terminal is a Session Border Controller (SBC).

19. A second terminal for supporting session setup in a mobile communication system comprising a first terminal and the second terminal which relays packet data of the first terminal between a Policy and Charging Enforcement Function (PCEF) and a Proxy Call Session Control Function (PCSCF), the second terminal being configured to:
receive a first session setup request message including Internet Protocol (IP)/Port information of the first terminal from the PCEF;
check the IP/Port information of the first terminal included in the first session setup request message; and
send a second session setup request message which includes a header including the IP/Port information of the first terminal and includes IP/Port information of the second terminal to the PCSCF.

20. The second terminal of claim 19, wherein the second terminal is a Session Border Controller (SBC).

\* \* \* \* \*